United States Patent [19]

Mayer

[11] 4,284,057
[45] Aug. 18, 1981

[54] ANTIPARASITIC IGNITION DEVICE FOR CARS

[76] Inventor: Ferdy P. Mayer, 18, rue Thiers, 38000 Grenoble, France

[21] Appl. No.: 95,139

[22] Filed: Nov. 6, 1979

Related U.S. Application Data

[63] Continuation of Ser. No. 870,541, Jan. 18, 1978, abandoned.

[30] Foreign Application Priority Data

Jan. 20, 1977 [FR] France ................... 77 01500

[51] Int. Cl.³ ............................................. F02P 3/06
[52] U.S. Cl. ..................... 123/633; 123/596; 123/650
[58] Field of Search ........ 123/148 P, 148 DC, 148 E, 123/169 P, 169 PA, 169 PH, 179 BG, 633, 644, 650, 596; 313/134; 338/66; 333/12, 79; 339/143 S

[56] References Cited

U.S. PATENT DOCUMENTS

| 1,223,180 | 4/1917 | Kettering | 123/148 DC |
|---|---|---|---|
| 2,180,704 | 11/1939 | Dietrich et al. | 123/148 P |
| 2,478,739 | 8/1949 | Beck | 123/179 BG |
| 2,768,227 | 10/1956 | Ruckelshaus | 123/148 P |
| 3,248,604 | 4/1966 | Richards | 123/148 P |
| 3,361,886 | 1/1968 | Prickett | 123/148 P |
| 4,099,508 | 7/1978 | Noguchi et al. | 123/148 DC |
| 4,147,145 | 4/1979 | Domland et al. | 123/148 E |

Primary Examiner—P. S. Lall
Attorney, Agent, or Firm—Oblon, Fisher, Spivak, McClelland & Maier

[57] ABSTRACT

A device and a method are provided for improving the operation of ignition devices, in which the parasitic waves causing interference are attenuated by means of a combination of resistors, connected in the primary and/or secondary of the ignition circuit (high voltage circuit of the coil). According to the invention, frequency sensitive resistor cables and a direct or simulated secondary resistance (formed by a small resistance placed in the primary of the ignition circuit) are substituted for the classical secondary resistive ignition cables and/or lumped resistors.

Ignition and RFI-radiation can so be optimized by reducing ignition energy to its original level, and by adapting the last to the actual need i.e. varying its value in accordance with engine rpm etc.

30 Claims, 3 Drawing Figures

ANTIPARASITIC IGNITION DEVICE FOR CARS

This is a continuation of application Ser. No. 870,541, filed Jan. 18, 1978, now abandoned.

BACKGROUND OF THE INVENTION

The present invention relates generally to an ignition interference suppressor method and device for cars. Ignition circuits for internal combustion motors comprise mainly a low voltage circuit 1 and a high voltage circuit 2 (FIG. 1). The low voltage circuit comprises a direct current source, the low voltage winding 4 of a coil 3 and breaker points, and the high voltage circuit comprises the high voltage winding 5 of the coil feeding spark plugs, through a distributor 6. Such circuit layouts have the drawback of radiating interference which acts as a nuisance to high frequency waves reception in the surroundings. For these reasons, various anti-parasitic devices have been proposed. It is known to use in the high voltage ignition circuit of internal combustion engines distributed or lumped resistances (e.g. in the spark-plugs, plug caps, in the distributor, the connections or the ignition cables), which function essentially to reduce the power of the spark (which is the interference source), and to reduce the antenna radiation efficiency of adjacent parts, and in this way operate as an antiparasitic or anti-interference device.

In a typical application, an ohmic resistor of 15 kΩ is placed in the spark-plug, and in addition the ignition cable has a linear resistance of 15 KΩ. Resistance values of 10 KΩ to 100 KΩ are currently used in the secondary circuit of the coil.

With a high voltage generating system of sufficient power and voltage to take in account the thereby lost ignition energy, correct operation of the engine is nevertheless secured.

But, evidently, the use of such resistances is inefficient from both a technical and an economical viewpoint. Expensive high voltage ignition power is produced for thereafter having a part of it destroyed: low reliability and short service life semi-conductive materials are used, and special spark plugs (with built-in resistor) which cost is two or three times that of usual spark plugs, in view of suppressing interferences. There is no doubt that such a solution is not cost-effective. Modern methods for the suppression of interferences in ignition devices involve a frequency-selective absorption: the high voltage circuit has a low DC-resistance (e.g. 100 Ω to several KΩ) for maintaining the power of the spark due to the direct current and the low frequency components of the ignition current; but it has a very high resistance for the high frequencies, which represent the interference. Such devices are disclosed in U.S. Pat. Nos. 3,191,132—3,309,633 and 3,573,676.

For the high frequencies, the antiparasitic effect of such frequency-selective cables is no longer limited, since in this range such absorption effect can be unlimited without even impeding ignition. Besides, the metallic conductor in the cable has a high grade reliability. Due to these facts, such ignition cables have been broadly used these last years in many countries.

But, if such cables and plug caps are used in a car designed for high resistance suppressor elements in the ignition circuit, the following drawbacks occur (1) the ignition current is too high, which can increase the wear of the spark plug;

(2) the increased ignition current can cause more intense secondary parasitic radiations to be radiated either by inductive or capacitive coupling through various parts (acting as secondary antennas) placed in the proximity of the radiation source, such as spark plug heads, distributor's heads, etc, or by increased direct radiation of these parts. Due to the stronger spark, there results at least a partial deterioration of the high quality overall suppression effect of the cables with frequency-sensitive resistance.

It is known, particularly, that this secondary radiation presently sets the essential limitations of these improved antiparasitic methods and devices, more especially in the AM-radio frequency range (where frequency-selective absorption is not efficient) and in the case where very low RFI-fields are desired.

It is possible, of course, to shield radiating parts (to put shielded caps on spark plugs and on, or in, the distributor, etc . . . ) but this is expensive and may have other drawbacks.

STATEMENT OF THE INVENTION

It should be apparent, therefore, that a need still exists in the art for a method and device for suppressing RFI interference, and which overcome the problems associated with the ignition of internal combustion engines.

Consequently, there is provided in accordance with the invention, a method allowing optimization of the performances of these frequency sensitive suppressor techniques and comprising the addition to these selective effects of a secondary (high voltage) circuit direct or simulated resistance, designed for providing an equivalent total secondary resistance identical to that for which the ignition system has been designed (with its RFI suppressor effect due to pure resistance), and thus to optimize both ignition and RFI suppression . The optimization of ignition is obtained in achieving the original lower value of ignition current (provided for by the classical resistive suppressor device). The interference radiation suppression is optimized, because by the very same, radiation and coupling of secondary antennas near the RFI sources is reduced. This resistance can also be added as a lumped resistor in the secondary circuit.

This secondary resistance can be simulated by placing in the ignition coil primary circuit one or several resistances, series or parallel connected with the low voltage winding of the coil. An analytic study of such a circuit (FIG. 1), starting from the electrical equivalence shows:

a primary series connected resistor R simulates a secondary value equal to R multiplied by the square of the coil transformer ratio. Such a resistance does not alter the value of the ignition high voltage for the spark plug (before firing) but reduces the current, due to the voltage drop provided after firing a condition which is exactly as required;

a primary parallel connected resistance R' in the same way simulates a secondary (parallel) resistance which is multiplied by the square of the transformer ratio, thereby reducing the high voltage before firing. The effect is the same as a resistance to ground in the high voltage circuit, such as a fouled spark plug, ground fault, etc . . . ;

a variation of the magnetic circuit, such as a variation of the saturation (i.e. reduced volume) of the effective section, of the air gap, etc . . . can evidently simulate series or parallel resistances, such as hereinabove described.

The optimization so described is obtained when, after having substituted the frequency-sensitive ignition cables, spark plugs and plug caps, etc. for the corresponding resistive parts, and after having connected one or more secondary or simulated secondary resistances as described above, the ignition performances obtained are the same as before, with, in particular an identical reserve of power and ignition voltage. Under these conditions, and in accordance with the invention, the combination of the direct or simulated direct current resistance and the frequency sensitive resistance (with its metallic structure) provides both optimum ignition performance and minimum high frequency parasitic radiation.

The direct or simulated resistors to be added, may be added dynamically, instead of being permanently installed. For example, one may take advantage of a higher ignition reserve during starting, or special engine working conditions; later on, when normal conditions are restored, these resistors are added to the circuit, by manual control or automatic control as a function of one of the vehicles engine functions.

Finally, the direct or simulated resistors may be a part of an adaptive control, where, for example, their value is regulated by a feedback system maintaining the minimum necessary ignition power for good engine performance. Such a servo-concept may be controlled through cylinder-pressure, exhausted gas control, spark-gap ionisation, etc.

With these and other objects, advantages and features of the invention that may become hereinafter apparent, the nature of the invention may be more clearly understood by reference to the following detailed description of the invention, the appended claims and the attached drawings.

DESCRIPTION OF THE PREFERRED EMBODIMENT

Figure 1:
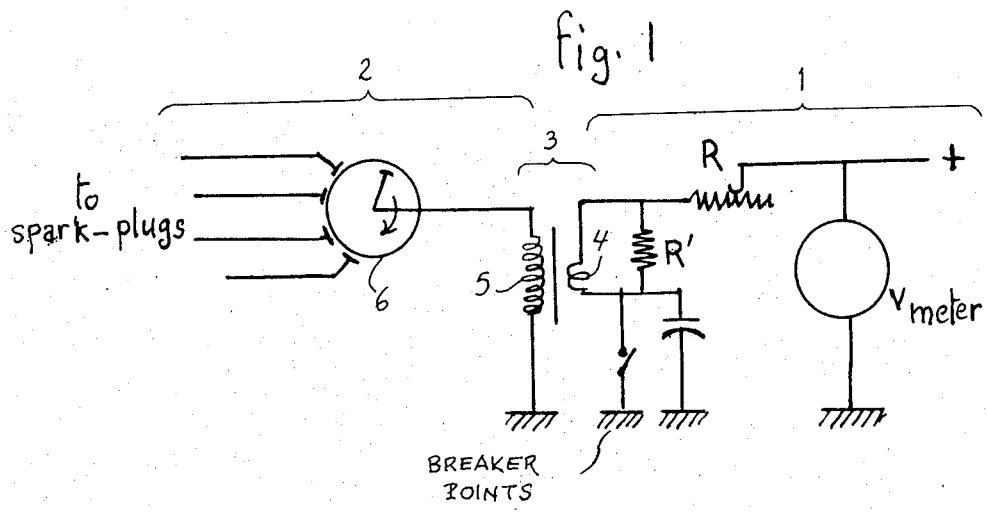
FIG. 1 is a schematic diagram of a car ignition circuit, comprising in addition a parallel connected resistor R' and a series connected rheostat R in the low voltage primary circuit.

For purpose of illustration, the invention herein will be first described in the case of a primary series connected resistance, i.e. the case when the ignition power becomes too high if the high voltage resistive ignition wires are replaced by low resistance frequency-sensitive ignition wires. The engine being fitted with its original resistive ignition harness is started, and a rheostat R of low resistance is introduced in series in the primary circuit of the coil (FIG. 1). Starting from zero, the resistance of the rheostat is gradually increased and for a well defined value $R_1$, suddenly the engine stalls. After that, the resistive ignition cables, resistive spark-plugs and spark caps are replaced by a frequency sensitive harness and normal, non-resistive plugs and caps: then the same procedure is replated. The engine stops for a resistance value $R_2$, greater than $R_1$. The difference $R_2 - R_1$ is the simulated resistance, equivalent to the resistance of the secondary resistive circuit. (Of course, the rheostat R could be connected in parallel with the primary circuit of the coil, in which case one would start the procedure by setting the rheostat at infinite resistance, and then gradually decreasing the resistance until the engine stalls).

A fixed resistance, the value of which is $R_2 - R_1$, is connected in the primary circuit of the coil, and thus, one obtained ignition performances identical to those obtained with the original resistive ignition wires, and with a minimum of interference radiations in the radio, UHF and VHF ranges.

A typical representative example will be described now, using a Chrysler 1100 car, of European production. The primary HV-coil resistance was 3.39 $\Omega$ (cold) and 3.60, respectively $\Omega$ (warm). The CEM equipment consisted of resistive ignition wire of an average value of 11 K$\Omega$ per wire, resistive plugs of 7.4 K$\Omega$ and a distributor resistance of the same value.

Figure 2:
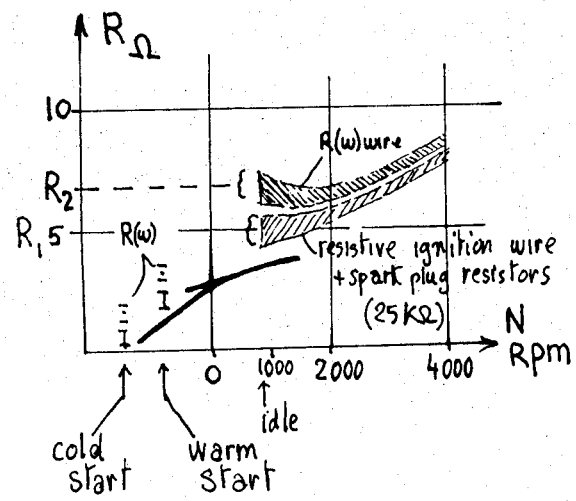
FIG. 2 is a diagram showing the resistance R in ohm $\Omega$ versus motor rotation N in rpm.

FIG. 2 represents measured values of the series resistances $R_1$ and $R_2$, after temperature -stabilization of the engine (for all but cold start experimentation) and voltage-stabilization of the battery. Starting tests lasted for 2 seconds, without acceleration.

One may observe three important facts:

(1) The simulated resistor value ($R_2 - R_1$) is about 1 to 2$\Omega$, and it is motor-revolution speed dependant. A primary resistor of 1.5$\Omega$ gives the exact equivalent of the OEM-ignition reserve. Taking into account the coil primary resistance of 3.6$\Omega$, this means a reduction of 30% of the primary current, and about 60% of ignition system energy: reducing wear of the breaker contacts, and allowing for a smaller and cheaper coil. This also means that a non-negligeable part of the primary energy is lost in the OEM resistive RFI- supressor parts. It is clear that ignition reserve is smaller for cold starting the, case for which the OEM-system has been designed.

(2) It appears clear that, after the engine has started, the ignition reserve is very high, i.e. a primary series resistor of 5$\Omega$ may be inserted without impairing the engine's performance (or a secondary total resistance of about 100 K$\Omega$). This proves the feasibility of "dynamic insertion" (after starting) of a resistance much higher than the OEM-secondary resistance or of its primary equivalent. In this case, with a 3.6$\Omega$ coil primary reistance, primary ignition current may be reduced to about 30% of its initial OEM valve. Many practical embodiments are feasible with such an approach. Here is a non-restrictive list:

use of a fixed secondary resistor (between 20 K$\Omega$ and 100 K$\Omega$) inside the distributor, connected across a centrifugal switch).

use of a fixed resistor in the primary, connected across a switch, actuated by motor speed, by the motor starting solenoid (short-circuiting it only during motor starting), by a tachometer control, by manifold pressure (which is a function of motor speed and power), by acceleration pedal position etc.

use of a resistor in the primary, or in the active secondaries of the HV coil, the resistor being sensitive to temperature, as, for example a "positive temperature coefficient" resistor, with a progressive or abrupt R(t) slope (slope of resistance vs. temperature). In the secondary, such a resistor may be mounted in the distributor or several included in each spark-plug and/or spark-plug cap. The use of temperature -sensitive semiconductive ignition cables is another variant of application of the concept.

In general, control of the total or progressive inclusion of the resistor by any control variable related to engine functioning and ignition reserve need.

Figure 3:
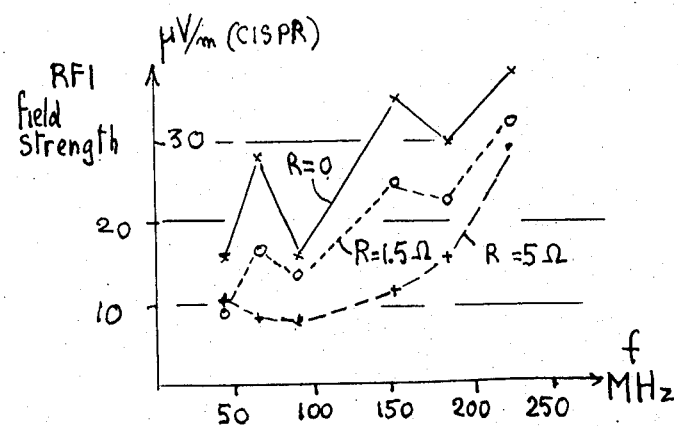
FIG. 3 is a diagram showing the intensity of parasitic field in micro volts/meter ($\mu$V/m) measured according to CISPR rules, versus frequency f in MHz.

(3) The so-achieved reduction of ignition energy, may lead one to expect a decrease of RFI as well. FIG. 3 represents actual interference-measurements, after CISPR (Comité International pour la Suppression des Parasites Radioélectriques) rules, made on the above car. The upper curve shows RFI radiation with R=O, the ignition circuit equipped with frequency sensitive suppressor cables only. {With the above described OEM (Original Equipment Manufacturer) equipment, radiated RFI exceeds, by far, the 30 µV/m limit}. Insertion of a primary resistor of 1.5Ω shows an average decrease of about 6 db with the disappearance of resonance effects which are often associated with secondary RFI-radiation. It is obvious to replace above "dynamic control" of ignition reserve by a feedback control: in such cases the direct quality and instant performance of ignition is surveyed, directly by ionisation of the spark-gap or RFT-PAD (Pulse Amplitude Distribution) from cylinders for example, indirectly by pressure built-up in the cylinder (during explosion), electro-chemical control of exhaust gases, etc. This concept of "adaptive ignition" may be part of the recently introduced electronic injection controls: in this case, ignition is optimized vs. best engine power performance and RFI-control.

The same reasonings apply for the parallel connected resistance, influencing this time the high voltage before firing.

Another advantage of the invention is to be seen in the fact that in suppressing partially or wholly the simulated resistances, the ignition of the engine can be immediately enhanced, which can be useful in some circumstances, such as starting in cold conditions, existence of faulty spark plugs, leakage in the high voltage circuit, etc.

Another advantage may be obtained in integrating this resistance $R_2-R_1$) in the primary circuit of the ignition coil. This allows one to use a conductive wire of a smaller diameter and/or a magnetic circuit of smaller dimensions with greater equivalent losses. It is also possible to use a smaller coil, lighter and cheaper, i.e. ultimately an important economical advantage. According to the invention, this important aspect of vertical integration is clearly visible because the ignition becomes immediately faulty when the frequency sensitive resistors of the secondary circuit are replaced by distributed and/or localized resistances of high values after addition of a resistance equivalent to, or in the order of the magnitude of $R_1$.

Thus, the invention can be characterized by the combination of frequency sensitive ignition wires having metallic conductors exhibiting low resistance to direct currents in the secondary high voltage circuit, and of at least one resistance in the secondary high voltage circuit or primary low voltage circuit to present or simulate, respectively, a resistance in the secondary circuit for optimizing both the ignition and the suppression of parasitic radiation emission in the radio, HF, VHF and UHF ranges. The resistance may be connected in either the primary circuit or secondary circuit and in either series or parallel with the circuit. Furthermore, the resistance may be variable in accordance with engine controls and engine operating parameters. More specifically, the resistor may be electrically inserted in the circuit after the motor is started and/or has achieved a certain minimum rotational speed by making use of existing engine control signals and devices, such as distributor or crank shaft centrifugal switches, the engine starter solenoid, tachometer control, manifold pressure sensors, ignition advance regulators, etc. Electrical insertion of the resistor may also be controlled in accordance with the temperature of the engine or engine environment. The value of the resistor may be continuously adapted to optimum ignition performance and optimum RFI suppression by the use of feed back control, wherein a transducer senses actual ignition performance directly or indirectly and regulates ignition reserve for optimum performance, i.e. minimum ignition energy and minimum RFI radiation.

In brief summary, the foregoing combination of frequency selective elements in the secondary circuit and a resistance in the primary and/or secondary circuit of the ignition coil provides an improved ignition energy reserve, as compared with prior art purely resistive secondary circuits, obtaining the advantage of the superior performance of frequency selective ignition wires, while reducing the wear of points and spark plugs and also reducing the secondary parasitic radiations, both of which would occur but for the resistance added to the primary or secondary circuit of the ignition coil.

While the invention has been more fully disclosed with reference to one preferred embodiment, it is understood that many modifications and changes will become apparent to those of ordinary skill in the art, and the present invention is intended to cover all such obvious modifications and changes which fall within the spirit and scope of the invention as defined in the appended claims.

I claim:

1. In an internal combustion engine ignition system of the type including: a DC power source supplying current through an ignition coil and a distributor to the engine's spark plugs; the coil having a low voltage primary winding circuit connected to the DC source, and a high voltage secondary winding circuit connected to the distributor; and means for repetitively interrupting the current flowing through the primary circuit; the improvement comprising the combination of:

frequency selective ignition wires interconnecting the distributor and the spark plugs, said wires exhibiting low resistance to direct and lower frequency currents below the radio frequency range and high resistance to higher current frequencies in the radio frequency range; and resistor means electrically connected to the ignition coil for reducing the ignition power flowing through the secondary circuit to the minimum value required for substantially zero ignition reserve, thereby minimizing both the wear on the spark plugs and also secondary parasitic radiations, both of which would otherwise occur but for the presence of said resistor means, said zero ignition reserve being a value of ignition power which is the minimum necessary for efficient spark ignition.

2. The improvement of claim 1 wherein said resistor means comprises a resistor having a resistance whose value varies adaptively as a function of different operating conditions of the engine, such that said ignition power is maintained at said minimum value for said different operating conditions.

3. The improvement of claim 2 wherein said resistor has a resistance/temperature characteristic such that the value of ignition current increases as the operating temperature of said engine decreases.

4. The improvement of claim 3 wherein said resistor is connected in parallel with the secondary circuit of said ignition coil and wherein its resistance increases as its temperature decreases.

5. The improvement of claim 3 wherein said resistor is connected in parallel with the primary circuit of said ignition coil and wherein its resistance increases as its temperature decreases.

6. The improvement of claim 2 wherein the resistance of said resistor varies as a function of engine speed, such that the ignition current has said higher value when the engine speed is below a predetermined speed and said low value when the engine speed is above said predetermined speed.

7. The improvement of claim 6 wherein said resistor is connected in series with said secondary circuit, and further comprising engine-speed responsive switch means connected across said resistor for short circuiting said resistor when the engine speed falls below said predetermined speed.

8. The improvement of claim 2 wherein said resistor is connected in series with the secondary circuit of said ignition coil and wherein its resistance decreases as its temperature and the engine temperature decreases.

9. The improvement of claim 2 wherein said resistor is connected in series with the primary circuit of said ignition coil and wherein its resistance decreases as its temperature and the engine temperature decreases.

10. A method of improving the ignition efficiency of, and reducing the radio frequency interference radiation from, an internal combustion engine designed for operation with an ignition system including an ignition coil having a high voltage secondary circuit containing resistive components, including spark plugs and ignition wires, comprising the steps of:
  replacing the resistive ignition wires with frequency selective ignition wires which have the characteristic of presenting a low resistance to direct currents and lower frequency currents while attenuating radio frequency currents;
  replacing the remaining resistive components with standard, non-resistive components; and
  connecting in circuit with the ignition coil a separate resistor having an optimum resistance value such that the ignition current flowing through said secondary circuit to the spark plugs is large enough efficiently to fire the spark plugs and low enough to minimize both the wear of the spark plugs and also secondary parasitic radiations.

11. A method of claim 10 further comprising the steps of:
  connecting the resistor in series with the secondary circuit of the ignition coil; and
  varying said resistance value as a function of an engine operation parameter such that the resistance value is low when the operating parameter requires higher ignition current, and high at other times.

12. The method of claim 11 further comprising the step of choosing the resistor to have a temperature/resistance characteristic such that the resistance of the resistor decreases as the engine temperature decreases.

13. The method of claim 11 further comprising the step of short circuiting the resistor when the engine speed is below a predetermined speed.

14. In an internal combustion engine ignition system including a high voltage power source supplying power through a secondary winding circuit of a high voltage transformer and a distributor to the engine's spark plugs, a low-voltage D.C. source connected to the low-voltage primary winding circuit of the transformer, and means for forming current pulses in the primary circuit, the improvement for optimizing the ignition power supplied to the spark plugs by reducing said ignition power to the minimum value required to obtain substantially zero ignition reserve for different operating conditions of the engine, said zero ignition reserve being a value of ignition power which is the minimum necessary for efficient spark ignition, whereby spark plug life is maximized and radio frequency interference is reduced by supplying the minimum ignition power required for efficient ignition at each engine operating condition, said improvement comprising:
  controllable impedance means connected to the transformer for selectively decreasing the power delivered to the spark plugs in accordance with impedance values corresponding to those required to produce said substantially zero ignition reserve for each of said different operating conditions of the engine; and
  control means responsive to said different engine operating conditions for varying said impedance means to produce the impedance value required to produce said minimum value of ignition power required to obtain said substantially zero ignition reserve for each engine operating condition.

15. The improvement of claim 14 further comprising:
  sensor means for sensing said engine operating conditions and producing respective control signals indicative thereof; and
  means supplying said control signals to said control means for controlling said variable impedance means to produce said minimum value of ignition power for each operating condition.

16. The improvement of claim 15 wherein said variable impedance means comprises a plurality of fixed resistor means selectable in accordance with said control signals.

17. The improvement of claim 15 wherein said variable impedance means comprises continuously variable resistor means variable in accordance with said control signals.

18. The improvement of claim 15, 16 or 17 wherein said variable impedance means, said control means and said sensor means are connected in a closed loop.

19. The improvement of claim 18 wherein said impedance means comprises resistor means connected in series with said high voltage secondary circuit for reducing the ignition current to the minimum value required to produce said substantially zero ignition reserve.

20. The improvement of claim 18 wherein said sensor means comprises transducer means for sensing a combustion condition inside a cylinder of said engine.

21. The improvement of claim 20 wherein said impedance means comprises resistor means connected in series with said low voltage primary circuit for reducing the ignition current to the minimum value required to produce said substantially zero ignition reserve.

22. The improvement of claim 20 wherein said impedance means comprises resistor means connected in series with said high voltage secondary circuit for reducing the ignition current to the minimum value required to produce said substantially zero ignition reserve.

23. The improvement of claim 20 wherein said impedance means comprises resistor means connected in parallel with said high voltage secondary circuit for reducing the ignition voltage to the minimum value required to produce said substantially zero ignition reserve.

24. The improvement of claim 20 wherein said impedance means comprises resistor means connected in parallel with the low voltage primary circuit for reducing the ignition voltage to the minimum value required to produce said substantially zero ignition reserve.

25. The improvement of claim 18 wherein said impedance means comprises resistor means connected in series with said low voltage primary circuit for reducing the ignition current to the minimum value required to produce said substantially zero ignition reserve.

26. The improvement of claim 18 wherein said impedance means comprises resistor means connected in parallel with said high voltage secondary circuit for reducing the ignition voltage to the minimum value required to produce said substantially zero ignition reserve.

27. The improvement of claim 18 wherein said impedance means comprises resistor means connected in parallel with the low voltage primary circuit for reducing the ignition voltage to the minimum value required to produce said substantially zero ignition reserve.

28. A method of optimizing the ignition power delivered by an ignition circuit to the spark plugs of an internal combustion engine for a plurality of different engine operating conditions so that only the minimum power required for substantially zero ignition reserve is delivered to the spark plugs, said zero ignition reserve being a value of ignition power which is the minimum necessary for efficient spark ignition, said method comprising the steps of:
    sensing the different operating conditions of the engine; and
    adaptively varying the impedance of the ignition circuit in accordance with the sensed engine operating conditions to deliver said minimum ignition power for each sensed operating condition.

29. The method of claim 28 wherein the impedance is adaptively varied to produce the minimum ignition current required to obtain said substantially zero ignition reserve.

30. The method of claim 28 wherein the impedance is adaptively varied to produce the minimum ignition voltage required to obtain said substantially zero ignition reserve.

* * * * *